United States Patent Office 3,469,650
Patented Sept. 30, 1969

3,469,650
AIR CUSHION VEHICLE HAVING A FLEXIBLE SKIRT PROVIDED WITH AUTOMATIC AIR LUBRICATION MEANS
Derek James Hardy, Cowes, Isle of Wight, and Lavis Albert Henry Riddle, East Cowes, Isle of Wight, England, assignors, by mesne assignments, to British Hovercraft Corporation Limited
Original application Oct. 7, 1965, Ser. No. 493,650, now Patent No. 3,410,241, dated Nov. 12, 1968. Divided and this application Mar. 11, 1968, Ser. No. 711,965
Claims priority, application Great Britain, Oct. 28, 1964, 44,006/64
Int. Cl. B60v 1/16; B63b 1/34
U.S. Cl. 180—128                    4 Claims

ABSTRACT OF THE DISCLOSURE

An air cushion vehicle is provided with air holes or jets carried by the flexible skirt wall to provide an air film on the skirt wall when the skirt contacts the surface, especially water, over which the vehicle is traveling. Parts of the lower margin of the skirt wall are arranged to be hingeable about horizontal axes, the air holes or jets being arranged to be closed when the skirt is out of the water and the lower margin is hinged downwardly, and to be opened when the lower margin is hinged upwardly due to contact with the water.

CROSS REFERENCE TO RELATED APPLICATION

This application is a division of our copending application Ser. No. 493,650, filed Oct. 7, 1965, now U.S. Patent No. 3,410,241, entitled "Air Cushion Vehicles."

BACKGROUND OF THE INVENTION

This invention relates to air cushion vehicles having flexible skirts, and has especial, but not exclusive, reference to an air cushion vehicle having a flexible skirting arrangement comprising an outer wall and an inner wall constituting an air supply duct serving nozzles forming peripheral jets, and the invention will be described in connection with such vehicles. The invention is particularly directed to flexible skirt construction for such vehicles.

A disadvantage of air cushion vehicles is a characteristic known as "ploughing in," and from present day knowledge it appears that this occurs at high speed over water, where the dynamic head of the water is considerably greater than either the plenum pressure in the skirt or the cushion pressure behind it. This may lead to a local deflection of the skirt, particularly near the bow of the vehicle, and this not only causes drag, but also induces suction forces that pull the vehicle further into the water. It is an object of this invention to provide means whereby this ploughing in is lessened or obviated. More particularly, it is an object of this invention to provide an improved arrangement for lubricating the wall of the flexible skirt with air so as to prevent the water from adhering to the surface of the skirt, thus reducing the suction or drag effect of the water.

A disadvantage encountered when bleeding air from the skirt for the purpose of providing air lubrication is that when the skirt is out of contact with the water, valuable air is lost. In accordance with the invention, this may be overcome by the provision of means arranged to control the flow of air in accordance with the position of the skirt relative to the water.

SUMMARY OF THE INVENTION

In accordance with the invention, the air lubrication is provided only as needed, and accordingly there is little if any waste of pressurized air for this purpose when it is not needed. In the preferred embodiment of the invention, a flexible skirt for an air cushion vehicle includes means operative when the skirt is connected to the base structure of a cushion vehicle to pass at least one stream of air over at least a portion of the surface of the skirt member in response to contact between the skirt member and a surface over which the vehicle is traveling. In the particular preferred embodiment, a skirt wall is formed with air holes or jets which communicate with a source of pressurized air, such as the pressurized air inside an inflatable skirt of the double-walled type. Parts of the lower margin of the skirt wall are arranged to be hingeable about horizontal axes, and the air holes or jets are arranged to be closed when the skirt is out of the water and the lower margin is hinged downwardly, and to be opened when the lower margin is hinged upwardly due to contact with the water. The invention is, however, not limited to the particular preferred embodiment since other equivalent arrangements will be readily apparent.

DESCRIPTION OF THE PREFERRED EMBODIMENT

Figure 1:
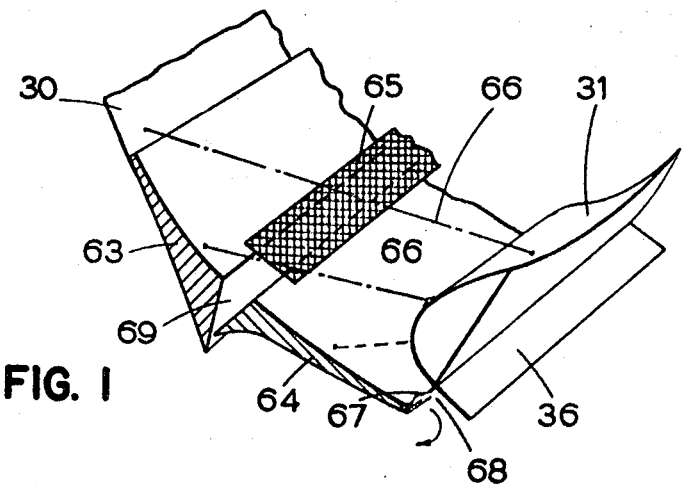
FIGURE 1 is a fragmentary perspective diagrammatic view of the lower portion of a conventional inflatable skirt provided with a hinged arrangement for the control of air holes or jets in accordance with a preferred embodiment of the invention.

We have shown in the drawings only so much structure as is reasonably necessary for an understanding of the present invention. Thus, we have not illustrated the details of a complete air cushion vehicle since the vehicle itself is a very well known and conventional type. It will be clear to persons skilled in the art that the skirt arrangement partially illustrated in the drawings is of the type comprising inner and outer flexible walls connected at their upper ends to the base structure of the vehicle in communication with a duct or the like leading to the main fan or compressor of the vehicle, whereby pressurized air is passed to the interior of the inflatable skirt to issue through the jet or orifice at the bottom thereof in the form of an air curtain for generating and maintaining the supporting cushion under the vehicle. For further details of this type of machine, attention is directed to our parent application Ser. No. 493,650.

Referring to the drawings, the lower part of the outer skirt wall 30 is formed with two strips 63, 64 hingedly connected by a strip 65 of net. The inner flexible wall 31 and the outer flexible wall 30 of the skirting arrangement are maintained at their correct distance apart by tie chain 66. A further tie chain 67 is arranged to maintain the lower end of the strip 64 relative to the lower edge 36 of the inner skirt wall 31. By this arrangement there is provided a main jet 68 and an auxiliary jet 69.

Figure 2:
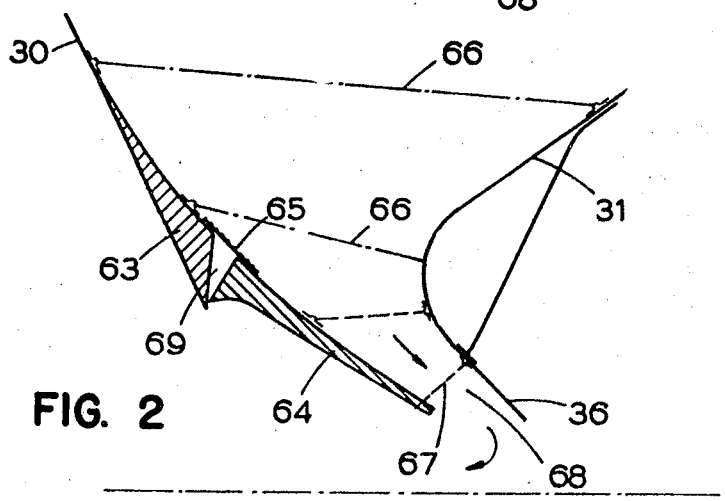
FIGURE 2 is a diagrammatic sectional view of the skirt arrangement of FIGURE 1 showing the normal configuration of the skirt during operation and when the skirt is free of contact with the surface over which the vehicle is traveling.
Figure 3:
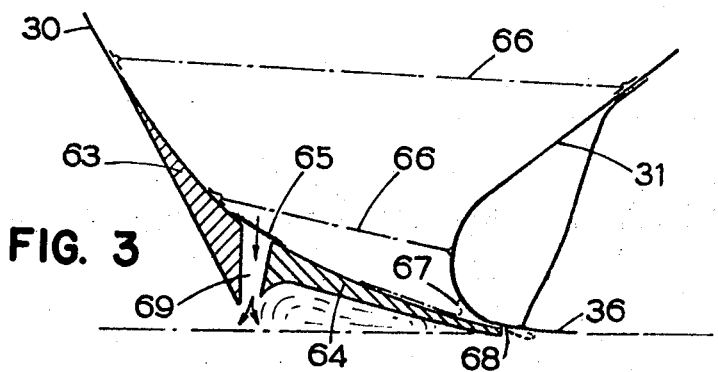
FIGURE 3 is a view corresponding to FIGURE 2, but showing the condition of the skirt when the lower end is in contact with the surface over which vehicle is traveling, which condition can be termed the operative state of the air lubricating arrangement.

During normal movement of the vehicle over water, but with the skirt out of contact with the water, the strip 64, as will be seen from FIGURE 2, is maintained by the pressure in the skirt and by the tie chain 67 so as to effect the formation of the normal main jet 68. When the skirt comes into contact with the water, as will be seen from FIGURE 3, the strip 64 and the lower edge 36 of the inner skirt wall 31 are forced upwardly, and the tie chain 67 collapses. The hinging of the strip 64 about its net hinge 65 causes closing of the jet 68 and the opening of the auxiliary air jet 69, which then fulfills the role of an air lubrication hole or spray suppression jet. When the skirt again moves out of contact with the water, the various members return to the condition shown in FIGURE 2, under the influence of the air pressure inside the inflatable skirt.

Although we have shown and described a specific embodiment of our invention, we are fully aware that many modifications thereof are possible and will be apparent to persons skilled in the art. Our invention, therefore, is not to be restricted to the precise details of construction shown and described.

We claim:

1. A skirt arrangement for an air cushion vehicle, comprising a flexible skirt member for connection to the base structure of an air cushion vehicle so as to depend therefrom to define, at least in part, a supporting cushion area, and means operative when the skirt member is connected to the base structure of an air cushion vehicle to pass at least one stream of air over at least a portion of the surface of the skirt member in response to contact between the skirt member and a surface over which the vehicle is travelling, said last mentioned means comprising a jet and means for opening said jet when said skirt member comes in contact with the surface and closing said jet when the skirt member is not in contact with the surface, said skirt member including first and second members at its lower end, said first and second members being hinged together to define said jet therebetween so that said jet is opened when one of said members is pivoted about said hinge by contact with the surface over which the vehicle is travelling and is closed when said one member pivots about said hinge in the opposite direction upon moving out of contact with the surface over which the vehicle is travelling.

2. In an air cushion vehicle comprising a base structure, and flexible skirt means depending from said base structure to define, at least in part, a pressurized supporting cushion, the improvement comprising means for passing at least one stream of air over at least a portion of the surface of said skirt means in response to contact between the skirt and a surface over which the vehicle is travelling, to act as air lubrication, said skirt comprising a double-walled inflatable skirting assembly having its interior in communication with a source of pressurized gas, and said last mentioned means comprising two members carried by one of said skirt walls and spaced apart but hinged together to define therebetween a jet, and means on the members normally closing the jet when the members are in their normal operating positions and opening the jet when one of said members contacts the surface and is pivoted away from the normal position.

3. In an air cushion vehicle comprising a base structure, and flexible skirt means depending from said base structure to define, at least in part, a pressurized supporting cushion, the improvement comprising means for passing at least one stream of air over at least a portion of the surface of said skirt means in response to contact between the skirt and a surface over which the vehicle is travelling, to act as air lubrication, said skirt comprising two spaced walls depending downwardly from said base structure, and flexible tie members connecting said walls adjacent their lower edges to define therebetween a main jet for forming an air curtain to assist in generating and maintaining the support cushion under the base structure, and said last mentioned means comprising two members hinged together in one of said walls for opening an auxiliary jet in said one wall when one of said hinged members contacts the surface over which the vehicle is travelling.

4. In an air cushion vehicle as claimed in claim 3 wherein said one of said hinged members is located at the lower edge of said one wall and defines part of said main jet, and is constructed and arranged to at least partially close said main jet automatically upon opening said auxiliary jet, said one hinged member being normally biassed by skirt pressure to open said main jet and close said auxiliary jet.

References Cited
FOREIGN PATENTS
272,730 10/1964 Australia.

A. HARRY LEVY, Assistant Examiner

U.S. Cl. X.R.
114—67.1